US006223196B1

(12) United States Patent
Hattori et al.

(10) Patent No.: US 6,223,196 B1
(45) Date of Patent: Apr. 24, 2001

(54) SHARED MAC (MULTIPLY ACCUMULATE) SYSTEM AND METHOD

(75) Inventors: Tetsuo Hattori; Yasuhiro Matsumoto, both of Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/074,941

(22) Filed: May 8, 1998

(30) Foreign Application Priority Data

Aug. 29, 1997 (JP) .................................................. 9-233741

(51) Int. Cl.[7] ........................................................ G06F 7/38
(52) U.S. Cl. .............................................................. 708/523
(58) Field of Search ................................... 708/523, 501; 712/221

(56) References Cited

U.S. PATENT DOCUMENTS

| 4,791,590 | * | 12/1988 | Ku et al. ............................... 708/523 |
| 5,204,828 | * | 4/1993 | Kohn ..................................... 708/501 |
| 5,457,804 | * | 10/1995 | Ohtomo ................................ 708/523 |
| 5,771,185 | * | 6/1998 | Miyake et al. ........................ 708/523 |
| 6,148,395 | * | 11/2000 | Dao et al. ............................. 712/221 |

* cited by examiner

Primary Examiner—David H. Malzahn
(74) Attorney, Agent, or Firm—Scully, Scott, Murphy & Presser; Marian Underweiser, Esq.

(57) ABSTRACT

The present invention provides for the sharing of a MAC unit included in a sub-processor by the sub-processor and a host processor, so that the period of time for the operation of the host processor is reduced, and the overall performance of the integrated dual processor module is enhanced.

More particularly, the present invention is directed to a shared multiply accumulate (MAC) system comprising: a host processor 11; a sub-processor 12 including multiply accumulate (MAC) unit 15; a host bus interface 13 forming a connection between the host processor 11 and the sub-processor 12; a first register set 17 in which a multiplier, a multiplicand, a product and a status are written in order for the performance of a multiply accumulate (MAC) operation required by the host processor 11; a second register set 18 in which a multiplier, a multiplicand, a product and a status are written in order for the performance of a multiply accumulate (MAC) operation required by the sub-processor 12; and selection means for selecting the first register set 17 or the second register set 18 upon receipt of a frequency division signal obtained by the division of an internal clock in the shared MAC system, wherein the MAC unit 15 in the sub-processor 12 performs the MAC operation in accordance with the contents of the first register set 17 or of the second register set 18 that is selected.

7 Claims, 5 Drawing Sheets

SHARED MAC (MULTIPLY ACCUMULATE) SYSTEM AND METHOD

BACKGROUND OF THE INVENTION

1. Technical Field

The present invention relates to a shared MAC (Multiply Accumulate) system and a method therefor, and in particular to a method whereby a MAC unit of a sub-processor is employed in common by the sub-processor and a host processor.

2. Prior Art

For a low end application, an integrated dual processor module that provides a high performance at low cost has been proposed for which a host processor and a sub-processor are integrated in a single chip and are independently operated. A host processor can be, for example, a CISC microcontroller for controlling the entire apparatus, and a sub-processor can be, for example, a fuzzy processor for performing a DSP function.

FIG. 1 is a block diagram illustrating the arrangement of a conventional integrated dual processor module. A CISC host processor 1 and a sub-processor 2 are connected by a host bus interface 3. In the sub-processor 2 are provided a memory 4 and a multiply accumulate (MAC) unit 5, which performs the important function required of the sub-processor 2. The MAC unit 5 of the sub-processor 2 normally performs a routine process, such as servo control for which repetitious MAC operations are required, while the microprocessor 1 is primarily responsible for overall system control. The exchange of data by means of interrupt signals transmitted via a memory or a register that is used in common has been proposed as a method by which the two processors can communicate.

In the conventional system, if a single MAC operation must be performed in a processing sequence handled by the host processor 1, either a multiplication instruction and an addition instruction provided for the host processor 1 must be combined to perform the MAC operation, or interrupt processing must be performed to assign the execution of the MAC operation to the MAC unit 5 in the sub-processor 2. In either case, however, a relatively long execution time is required for the processing. Particularly in the latter case, where the host processor 1 employs the interrupt process to assign the MAC operation to the sub-processor 2, the time required for the interrupt processing constitutes a bottleneck for its execution. Therefore, there is a demand for the development of a more efficient system whereby the MAC unit 5 in the sub-processor 2 can be employed in common by the sub-processor 2 and the host processor 1 without any interrupt processing being required.

It is one object of the present invention to improve the operational performance of an integrated dual processor module by reducing the period of time required for the processing performed by a host processor.

It is another object of the present invention to provide an efficient system whereby a Multiply Accumulate (MAC) unit in a sub-processor can be employed in common by the sub-processor and a host processor.

SUMMARY OF THE INVENTION

To achieve the above objects, according to a first aspect of the present invention, a shared multiply accumulate (MAC) system comprises: a host processor; a sub-processor including multiply accumulate (MAC) unit; a host bus interface forming a connection between the host processor and the sub-processor; a first register set in which a multiplier, a multiplicand, a product and a status are written in order for the performance of a multiply accumulate (MAC) operation required by the host processor; a second register set in which a multiplier, a multiplicand, a product and a status are written in order for the performance of a multiply accumulate (MAC) operation required by the sub-processor; and selection means for selecting the first register set or the second register set upon receipt of a frequency division signal obtained by the division of an internal clock in the shared MAC system, wherein the MAC unit in the sub-processor performs the MAC operation in accordance with the contents of the first register set or of the second register set that is selected.

The selection means may include first selection means for, in response to the frequency division signal, supplying to the MAC unit a multiplier and a multiplicand written either in the first register set or in the second register set, and second selection means for, in response to the frequency division signal, supplying either to the first register set or to the second register set a product obtained by the MAC unit and a status.

The MAC unit is constituted by a multiplication unit and an addition unit.

It is preferable that the first and the second register sets be provided in the sub-processor.

According to a second aspect of the present invention, provided is a multiply accumulate (MAC) method for a shared MAC system that includes a host processor, a sub-processor having a multiply accumulate (MAC) unit, a host bus interface connected between the host processor and the sub-processor, and a register set, the MAC method comprising the steps of: writing a multiplier and a multiplicand to a register set via the host bus interface so that a multiply accumulate (MAC) operation required by the host processor can be performed; permitting the MAC unit, in response to a frequency division signal obtained by dividing an internal clock in the shared MAC system, to perform the MAC operation in a time sharing manner based on the multiplier and the multiplicand written in the register set; writing in the register set a product and a status obtained as a result of the MAC operation; and transmitting the product and the status via the host bus interface to the host processor.

The sub-processor, of which a high-speed repetitious MAC operation function is required, does not perform the MAC operation very frequently in general because the frequency at which the repetitious servo control function and so on are employed is relatively low. Thus, the MAC unit provided for the sub-processor is used in common in a time sharing manner as an external operating unit for the host processor. To do this, a host processor register set and a sub-processor register set are selectively connected to the MAC unit in accordance with a frequency division signal obtained by dividing an internal clock in the shared MAC system, and the MAC operation is performed.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
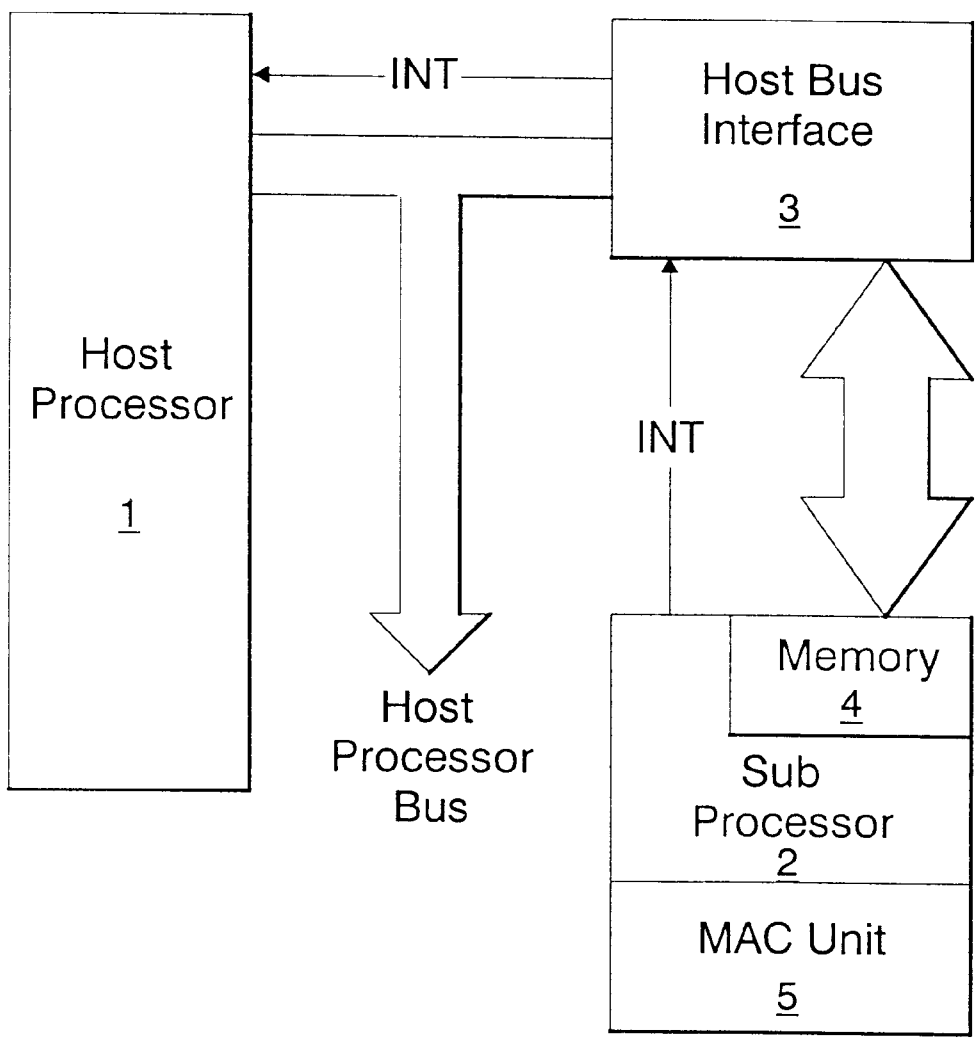
FIG. 1 is a block diagram illustrating the arrangement of a conventional integrated dual processor module.
Figure 2:
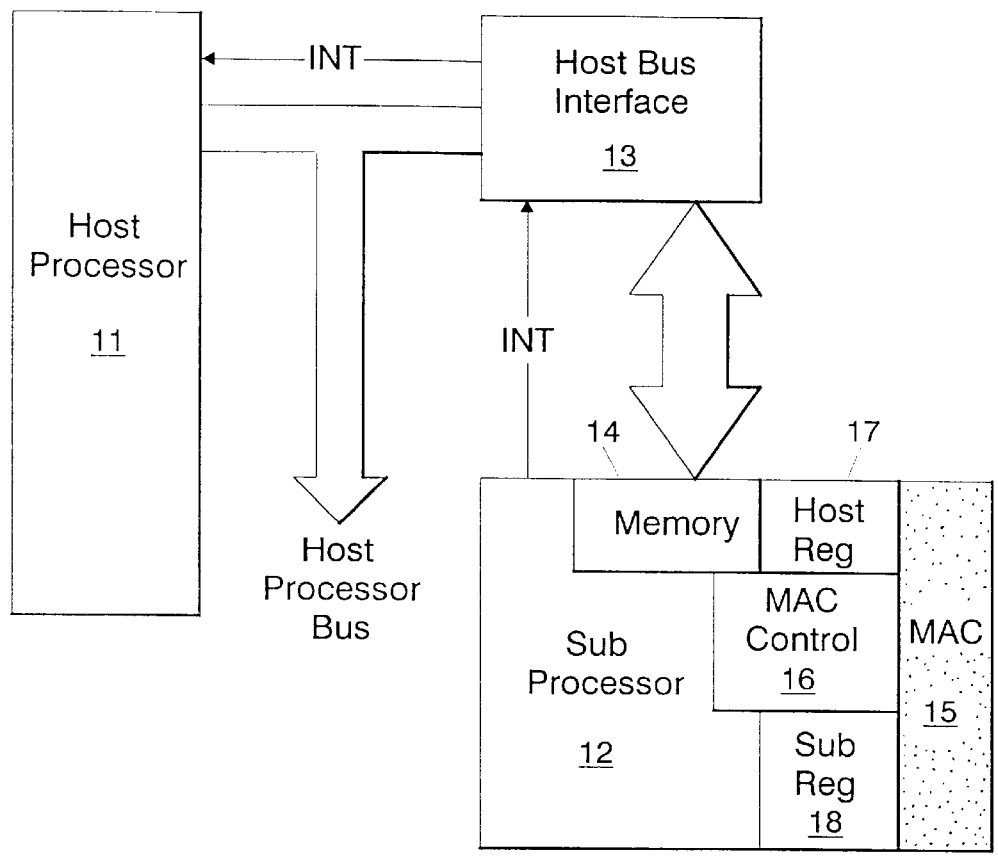
FIG. 2 is a block diagram illustrating the arrangement of a integrated dual processor module according to one embodiment of the present invention.

FIG. 2 is a block diagram illustrating the arrangement of an integrated dual processor module in one embodiment of the present invention. A host processor 11 and a sub-processor 12 are connected by a host bus interface 13. A memory 14, a MAC (Multiply Accumulate) unit 15, a MAC controller 16, a register set 17 for the host processor 11, and a register set 18 for the sub-processor 12 are provided for the sub-processor 12. The MAC unit 15 of the sub-processor 12 is used to perform an MAC operation, and the MAC controller 16 is used to control the processing sequence required for this operation. It should be noted that both the register set 18 for the sub-processor 12 and the register set 17 for the host processor 11 are prepared in the sub-processor 12.

Programs and data used independently by the host processor 11 are stored in the memory 14. The sub-processor 12 performs an allocated task, separately from the operation of the host processor 11, but for the efficient data transfer the host processor 11 and the sub-processor 12 share one part or all of the memory 14.

The host bus interface 13 is provided to control the exchange of signals between the host processor 11 and the sub-processor 12. In other words, the interface 13 monitors the signals to ascertain whether the host processor 11 and the sub-processor 12 access each other simultaneously and whether bus contention (conflict state) occurs. Specifically, the interface 13 controls the addresses for the writing and reading of data; transmits an interrupt request (INT) to relay to the host processor 11 a service request (e.g., notification forwarded to the host indicating that a predetermined operation has been completed) from the sub-processor 12; and monitors the interrupt state.

The MAC operation performed by the MAC unit 15 is an operation whereby a multiplicand (Y) is multiplied by a multiplier (X) and a product is added to a previous result (Prev SUM). In digital signal processing, a matrix operation is performed by repeating the MAC operation. This operation is employed as an application for servo control and so on. Hardware components required for the MAC operation are registers A1 and B1 for the storage of the multiplier (X) and the multiplicand (Y), a multiplication unit (MULTIPLIER); an addition unit (ACCUMULATOR); a register (C1/C2) for the storage of operation results; and a register (D1) for the storage of a status. These components are employed to execute the following equation:

$$\text{SUM}(i)=X(i)*Y(i)+\text{SUM}(i-1) i=1, 2, \ldots \quad \text{[Equation 1]}$$

Assuming that the lengths of the multiplier (X) and of the multiplicand (Y) are each 16 bits, the result (SUM) will be 32 bits, which corresponds to a length that is twice as long. When there is an overflow (either positive or negative) in the result, it is recorded in the register D1 in which status is recorded.

In order that the MAC unit 15 constituted by the multiplier and the accumulator can be used not only by the sub-processor 12 but also by the host processor 11, in the sub-processor 12 are provided two types of register sets, which is the feature of the circuit arrangement for this embodiment. That is, not only is the register set 18 provided for the MAC operation performed by the sub-processor 12, but also the register set 17 for the MAC operation performed at the request of the host processor 11. The register sets 17 and 18, for the respective host processor 11 and the sub-processor 12, each have an A1 register for storing a multiplier (X), a B1 register for storing a multiplicand (Y), a C1/C2 register for storing the operation result, and a D1 register for storing the status. One of these registers is selected in response to a signal obtained by dividing an internal clock, and the MAC operation is performed in a time sharing manner.

With this control method, whereas to the host processor 11 it appears that automatic performance of an MAC operation results from the writing of data to the external register sets, in this embodiment, the MAC operation is performed in a time sharing manner, and no interrupt request need be transmitted to the sub-processor 12. To acquire the results of an MAC operation, after the host processor 11 writes data required for the MAC operation into the A1 register and the B1 register, it then sequentially reads the operation results from the C1/C2 register. In other words, the results of an MAC operation can be obtained merely by writing to and reading from the external register sets.

Figure 3:
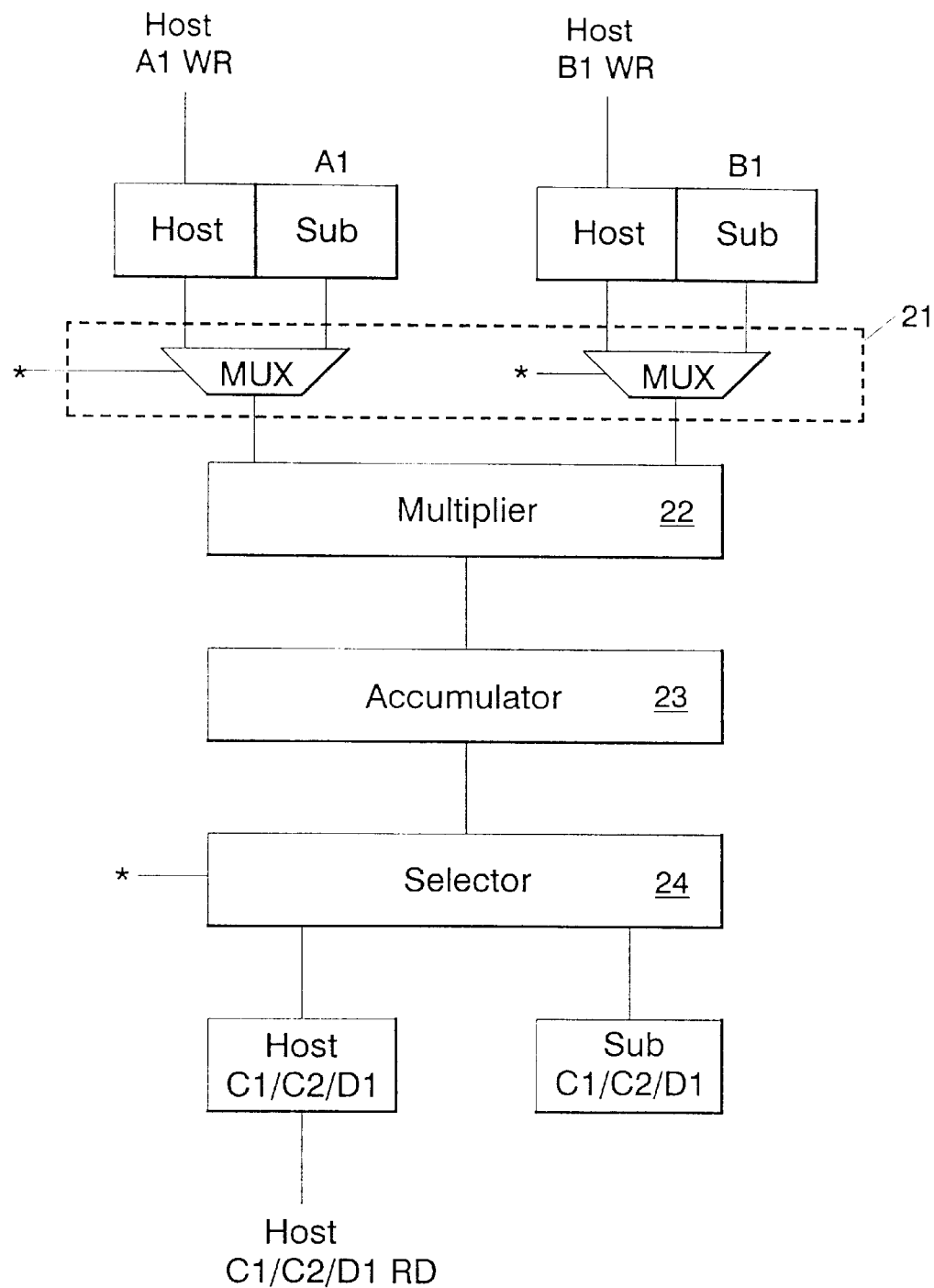
FIG. 3 is a block diagram illustrating a multiply accumulate (MAC) unit 15 in the embodiment.

FIG. 3 is a block diagram illustrating the MAC unit 15 in this embodiment. The MAC unit 15 is constituted by a first selector 21, a multiplier 22, an accumulator 23 and a second selector 24. Upon receipt of a select signal (MAC Sharing), the first selector 21 and the second selector 24 select either the register set 17 for the host processor 11 or the register set 18 for the sub-processor 12. Specifically, in accordance with the select signal (MAC Sharing), the selector 21, which has two selectors MUX, supplies to the multiplier 22 the multiplier (X) and the multiplicand (Y) stored in the registers A1 and B1. The multiplier 22 and the accumulator 23 then perform the above described MAC operation under the control of the MAC controller 16. Thereafter, in response to the select signal (MAC sharing), the second selector 24 supplies the results and the status to the selected C1/C2 and D1 registers. For an MAC operation that is requested by the host processor 11, the results and the status are transferred to the host processor 11 via the host bus interface 13.

The select signal (MAC Sharing) selects the performance of the MAC operation for either the host processor 11 or the sub-processor 12. A signal obtained by dividing the internal clock of the host processor 11 is employed as the select signal. The divider for the internal clock is determined by the relationship of the clock frequencies for the host processor 11 to those of the sub-processor 12. Since, as an example, it is possible to perform one MAC operation each clock cycle for a low end application where the internal clock is about 50 MHZ, the assumption that the internal clock is divided by 2 is applied.

When the internal clock is about 50 MHZ, one operation each clock is possible when a 32 bit output (16+16 bits) is implemented for the MAC unit 15. Thus, for each clock cycle, the state of occupancy of the MAC unit 15 can be switched to accommodate either the host processor 11 or the sub-processor 12. Since a CISC microcontroller generally needs several clock cycles to write data to an external memory/register, only the writing and reading operation need be performed to obtain the results of the MAC operation, with the processing performed by the sub-processor being little affected.

Figure 4:
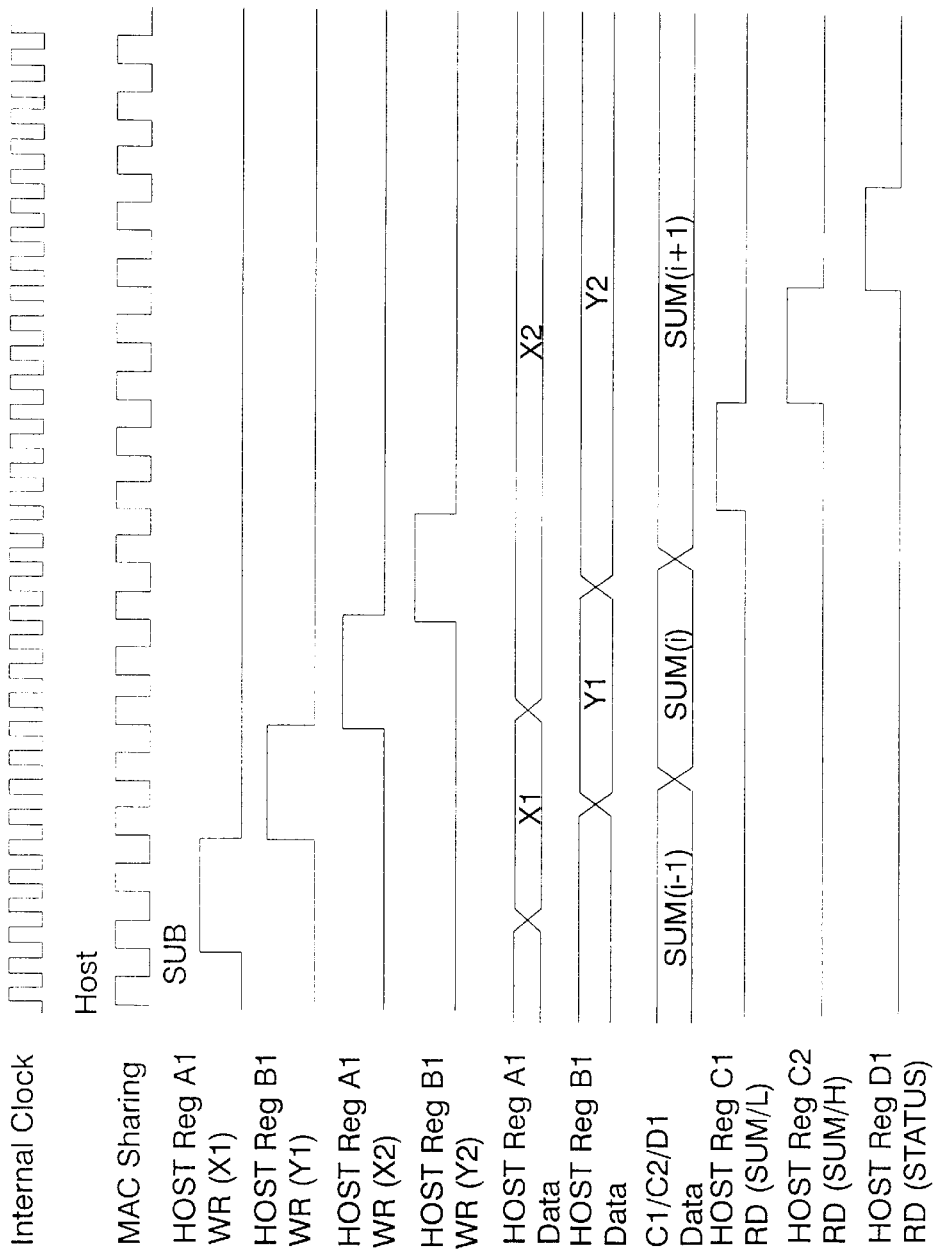
FIG. 4 is a timing chart of the state when the MAC operation is switched by a ½ frequency division signal.

FIG. 4 is a timing chart for the state when the switching of the following MAC operation is performed in response to the receipt of a ½ frequency division signal.

$$SUM = X1*Y1 + X2*Y2 + (\text{Previous SUM}) \qquad [\text{Equation 2}]$$

Since this timing is employed for the control of the MAC unit 15, the MAC unit 15 can be used in a time sharing manner by the host processor 11 and the sub-processor 12.

In FIG. 4 signal WR represents the writing (Write) to the A1 register and the B1 register, and signal RD represents the reading (ReaD) from the C1/C2 and the D1 registers. Signal HOST Reg A1 WR (X1) represents the writing of the multiplier (X) to the host A1 register. A multiplicand (Y1), a multiplier (X2), and a multiplicand (Y2) are written in the host processor register. Then, the results (SUM) of the operation X1*Y1+X2*Y2 are automatically set in the C1/C2 register, and when an overflow occurs, an overflow flag (STATUS) is set in the D1 register. Therefore, through the sequential reading of data from the C1/C2 and the D1 registers, the results of the operation can be obtained. Since several clock cycles are required for the writing and reading by the host processor, only the host processor need write data to the external memory and read required data for the automatic performance of the MAC operation. Since the reading overhead becomes relatively smaller as the number of MAC stages increases, the operational efficiency is improved. The same process can be performed at the same time by the sub-processor.

Figure 5:
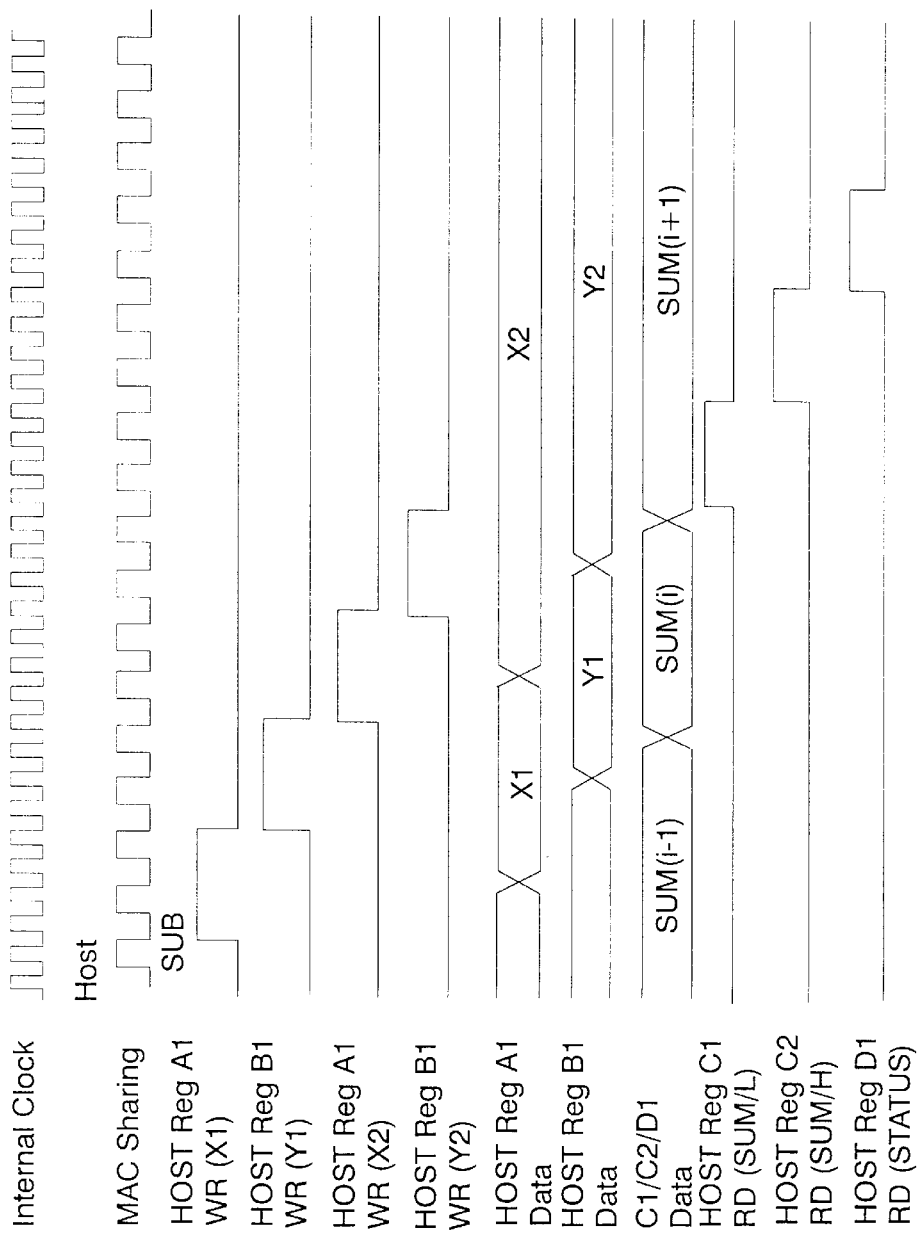
FIG. 5 is a timing chart of the state when the MAC operation is performed with one clock cycle delay.

Even if the writing of the multiplier to the A1 register is initiated when the select signal (MAC Sharing) selects the sub-processor, the same operation can be performed even though the operation start time is delayed one clock cycle. FIG. 5 is a timing chart for the state when the operation is initiated following one clock cycle delay. "HOST Reg A1 Data," "HOST Reg B1 Data" and "C1/C2/D2 Data" represent changes in the contents of the individual registers.

The select signal (MAC Sharing) merely determines the timing for the sharing of the MAC unit 15 by the host processor 11 and the sub-processor 12, and the MAC unit 15 is not always employed in either phase. That is, the select signal merely determines whether the host register set 17 or the sub register set 18 will be connected to the MAC unit 15.

When the host processor 11 does not require an MAC operation, it is preferable that the select signal (MAC Sharing) constantly select the sub-processor 12. Therefore, except for a period extending from the time the host processor 11 writes the multiplier (X) to the A1 register in the register set 17 to the time it reads the status from the D1 register, the select signal is set to the sub-processor 12. To do this, the order in which the multiplier (X) and the multiplicand (Y) are written and the order in which signals SUM/L, SUM/H and STATUS are read are specified. When a circuit whose latch is set upon the writing of the first multiplier (X) and is reset by reading signal STATUS, is additionally provided and a frequency divisional signal is gated by the circuit, it is employed as a select signal (MAC Sharing).

The following MAC operation time will now be discussed while employing CISC microcontroller 80C196 as an example.

$$SUM = X1*Y1 + X2*Y2 + (\text{Previous SUM})$$
$$\text{with Overflow Check} \qquad [\text{Equation 3}]$$

At least 90 clock cycles are required to perform this processing for which a common instruction is used. When the MAC unit proposed above is employed, only 56 clock cycles (including the reading of a flag) are required, and the performance can be improved by 38%. Further, while at least 135 clock cycles are required for a three-stage MAC operation, in this case only 72 clock cycles are needed, and the performance can be improved by 47%. As the number of stages for the MAC operation is increased, the degree to which the performance is improved is also increased. The degree of improvement for the performance is increased even more when overflow processing is required.

As is described above, the MAC unit included in the sub-processor is used in a time sharing manner as an external MAC unit for the host processor. Since the MAC unit is employed in a time sharing manner, the period of time required for the operation of the host processor can be reduced, while the operation of the sub-processor is little affected. As a result, the overall performance of the integrated dual processor module can be enhanced.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A shared multiply accumulate (MAC) system comprising:

a host processor;

a sub-processor including multiply accumulate (MAC) unit;

a host bus interface forming a connection between said host processor and said sub-processor;

a first register set in which a multiplier, a multiplicand, a product and a status are written in order for the performance of a multiply accumulate (MAC) operation required by said host processor;

a second register set in which a multiplier, a multiplicand, a product and a status are written in order for the performance of a multiply accumulate (MAC) operation required by said sub-processor; and selection means for selecting said first register set or said second register set upon receipt of a frequency division signal obtained by the division of an internal clock in said shared MAC system, wherein said MAC unit in said sub-processor performs said MAC operation in accordance with the contents of said first register set or of said second register set that is selected.

2. The shared MAC system according to claim 1, wherein said selection means includes:

first selection means for, in response to said frequency division signal, supplying to said MAC unit a multiplier and a multiplicand written either in said first register set or in said second register set; and second selection means for, in response to said frequency division signal, supplying either to said first register set or to said second register set a product obtained by said MAC unit and a status.

3. The shared MAC system according to claim 2, wherein said MAC unit is constituted by a multiplication unit and an addition unit.

4. The shared MAC system according to claim 2, wherein said first and said second register sets are provided in said sub-processor.

5. The shared MAC system according to claim 1, wherein said MAC unit is constituted by a multiplication unit and an addition unit.

6. The shared MAC system according to claim 1, wherein said first and said second register sets are provided in said sub-processor.

7. A multiply accumulate (MAC) method for a shared MAC system that includes a host processor, a sub-processor having a multiply accumulate (MAC) unit, a host bus interface connected between said host processor and said sub-processor, and a register set, said MAC method comprising the steps of:

writing a multiplier and a multiplicand to said register set via said host bus interface so that a multiply accumulate (MAC) operation required by said host processor can be performed;

permitting said MAC unit, in response to a frequency division signal obtained by dividing an internal clock in said shared MAC system, to perform said MAC operation in a time sharing manner based on said multiplier and said multiplicand written in said register set;

writing in said register set a product and a status obtained as a result of said MAC operation; and transmitting said product and said status via said host bus interface to said host processor.

* * * * *